United States Patent
Torres et al.

(10) Patent No.: US 11,026,231 B2
(45) Date of Patent: *Jun. 1, 2021

(54) MAINTAINING AND DISTRIBUTING STATE DUE TO TEMPORARY FAILURES IN A SHARED BANDWIDTH NETWORK

(71) Applicants: Rob Torres, New Market, MD (US); David Whitefield, Germantown, MD (US); Jayant Ramakrishnan, Germantown, MD (US)

(72) Inventors: Rob Torres, New Market, MD (US); David Whitefield, Germantown, MD (US); Jayant Ramakrishnan, Germantown, MD (US)

(73) Assignee: Hughes Network Systems, Germantown, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/856,712

(22) Filed: Apr. 23, 2020

(65) Prior Publication Data

US 2020/0252938 A1 Aug. 6, 2020

Related U.S. Application Data

(63) Continuation of application No. 16/172,496, filed on Oct. 26, 2018, now Pat. No. 10,667,264.
(Continued)

(51) Int. Cl.
*H04W 72/04* (2009.01)
*H04W 16/02* (2009.01)
*H04W 84/06* (2009.01)

(52) U.S. Cl.
CPC ....... *H04W 72/0453* (2013.01); *H04W 16/02* (2013.01); *H04W 84/06* (2013.01)

(58) Field of Classification Search
CPC .. H04W 16/02; H04W 72/0453; H04W 84/06
See application file for complete search history.

(56) References Cited

U.S. PATENT DOCUMENTS

| | | | |
|---|---|---|---|
| 9,276,663 B2 | 3/2016 | Foxworthy et al. |
| 9,444,785 B2 | 9/2016 | Jungck et al. |

(Continued)

FOREIGN PATENT DOCUMENTS

WO 2016205765 A1 12/2016

OTHER PUBLICATIONS

Ferrus et al., "SDN/NFV-enabled satellite communications networks: Opportunities, scenarios and challenges", Physical Communication, Elsevier, Amsterdam, NL, vol. 18, No. Part 2, Mar. 1, 2016, pp. 95-112, XP029429475. ISSN: 1874-4907, DOI: 10.1016/J.PHYCOM.2015.10.007 p. 97-105; figures 1-5.

(Continued)

*Primary Examiner* — Asad M Nawaz
*Assistant Examiner* — Thomas R Cairns
(74) *Attorney, Agent, or Firm* — Capitol City TechLaw; Jasbir Singh (57) ABSTRACT

A shared bandwidth network system to communicate network traffic between terminals and an external network is disclosed. The system includes: a point of presence (POP) for the external network; Radio Frequency Gateways (RFGWs) wherein each RFGW of the RFGWs provides one or more Radio Frequency (RF) paths, and each of the RF paths links a respective RFGW of the RFGWs with one or more terminals of the terminals; an RF path state manager to manage a RF path state for each of the RF paths; a Satellite Network Core (SNC); a Software Defined Network (SDN) controller to maintain a topology based on the RF path states, wherein the topology includes the POP, the RFGWs and the SNC; and a network layer to route network traffic (Continued)

between the POP, the RFGWs and the SNC based on the topology. The SNC includes a bandwidth manager to allocate bandwidth, to provide flow control to the terminals, and to provide a key state including a bandwidth allocation for each of the terminals, a key state manager to maintain the key states, and a link layer control (LLC) to transport network traffic over each of the RF paths.

20 Claims, 6 Drawing Sheets

Related U.S. Application Data (60) Provisional application No. 62/659,349, filed on Apr. 18, 2018.

(56) References Cited

U.S. PATENT DOCUMENTS

| | | |
|---|---|---|
| 9,774,385 B2 | 9/2017 | Foxworthy et al. |
| 9,961,557 B2 | 5/2018 | Sun et al. |
| 10,021,034 B2 | 7/2018 | Hong et al. |
| 10,211,909 B2 | 2/2019 | Vargas et al. |
| 10,349,462 B2 | 7/2019 | Altman et al. |
| 2009/0285121 A1 | 11/2009 | Tzannes |
| 2016/0037434 A1 | 2/2016 | Gopal et al. |
| 2016/0094467 A1 | 3/2016 | Hong et al. |
| 2019/0274052 A1 | 9/2019 | Zhao et al. |
| 2020/0008081 A1 | 1/2020 | Ashrafi |

OTHER PUBLICATIONS

International search report for International Application No. PCT/US2019/027688.

Provide a point of presence (POP) for the external network, Radio Frequency Gateways (RFGWs) and a Satellite Network Core (SNC)
602

↓

Manage a RF path state for each of the RF paths
604

↓

Allocate bandwidth, provide flow control to the terminals, and provide a key state including a bandwidth allocation for each of the terminals
606

↓

Maintain the key states
608

↓

Transport network traffic over each of the RF paths
610

↓

Maintain a topology based on the RF path states, wherein the topology comprises the POP, the RFGWs and the SNC
612

↓

Route network traffic between the POP, the RFGWs and the SNC based on the topology.
614

↓

Update the topology and routing based on changes to POP, RFGW and SNC connectivity
616

FIG. 6

MAINTAINING AND DISTRIBUTING STATE DUE TO TEMPORARY FAILURES IN A SHARED BANDWIDTH NETWORK

CROSS REFERENCE TO RELATED APPLICATIONS

The present application is a continuation of U.S. patent application Ser. No. 16/172,496, filed Oct. 26, 2018, which claims the benefit of U.S. Provisional Patent Application No. 62/659,349, filed Apr. 18, 2018, all of which are incorporated herein in their entirety by reference.

FIELD

A system and method to provide high availability and pooling of data center resources for shared bandwidth networks is disclosed. The satellite-based shared bandwidth network handles resource re-allocation between data centers and quick changes to a Radio Frequency (RF) path due to conditions such as fade inherent at certain frequencies, such as, Q- and V-band.

BACKGROUND

Subscribers of shared bandwidth networks have expectations of high availability. Moreover, to achieve higher bandwidth efficiencies for RF shared bandwidth networks, spectrum needs to be utilized that is more subject to degradation in conditions such as rain fade. In addition, in Radio Frequency (RF) shared bandwidth networks a considerable portion of a budget related to equipment switchover is the re-establishment of state.

As such, it is difficult for shared bandwidth networks to provision additional redundancy/diversity resources without the cost of outlaying a significant amount of unused/underutilized resources. Also, shared bandwidth networks may need to dynamically move network resources to react to conditions, such as, rain fade, without negatively impacting user experience, while reestablishing or maintaining the appropriate state after the switchover.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

The present teachings disclose maintaining a key state for a shared bandwidth network, for example, bandwidth control, even if the shared resource is switched from one path to another. In some embodiments, a system and method may dynamically move groups of network resources between physical locations using a Software Defined Networking (SDN) controller. An SDN controller may always be actively reacting to network topology changes, network conditions, desired diversity state or the like, while providing source routing and other network control information. In some embodiments, the present teachings may include a Network Functions Virtualization (NFV) controller for further orchestration and redundancy. In some embodiments, a method and system may use nested SDN/NFV controllers to allow end-to-end SDN/NFV in a shared bandwidth network, while utilizing SDN/NFV to move the control and lower layer segments efficiently between physical locations. The SDN/NFV controller may define a diversity group of media gateways to provide redundancies in the network.

The present teachings disclose a method and system for maintaining and distributing state due to temporary degradations or impairments in a shared bandwidth network. In some embodiments, the network may retain inbound bandwidth allocation state after a radio frequency gateway switchover. In some embodiments, the network may retain outbound bandwidth allocation state after a radio frequency gateway switchover.

In some embodiments, a link layer, a network layer, and an application layer are split between a Satellite Network Core (SNC) and a Radio Frequency Gateway (RFGW). The link layer for a satellite link may include sub-layers including a Media Access Layer (MAC) and a Satellite Layer Control (SLC). In some embodiments, along with splitting the link layer, sub-layers of the application layer such as acceleration (for example, Performance Enhancing Proxy (PEP)) may be disposed in the SNC. The splitting of the link layer may be used to deploy the SNC and the RFGW at geographically separate/distant locations. The split may deploy a SLC/MAC module in the SNC, along with a Media Access Control (MAC) layer in the RFGW. In some embodiments, source routing via the RFGW is on traffic aggregated across multiple terminals, typically, terminals serviced by an RF path (beam). The source routing is not a function of communicating with a specific individual terminal; rather the source routing may be a function of an intersection of a priority, an active RFGW, an active SNC, and a state of the Core Network connecting the RFGW and SNC.

In some embodiments, the link layer split may be reflected in other bandwidth limited media. For example, in a cellular system, such as a 4G or 5G cellular network, the link layer split may be provided between the MAC layer and a Radio Layer Control (RLC) module.

A shared bandwidth network system to communicate network traffic between terminals and an external network is disclosed. The system includes: a point of presence (POP) for the external network; Radio Frequency Gateways (RFGWs) wherein each RFGW of the RFGWs provides one or more Radio Frequency (RF) paths, wherein each of the RF paths links a respective RFGW of the RFGWs with one or more terminals of the terminals; an RF path state manager to manage a RF path state for each of the RF paths; a Satellite Network Core (SNC); a Software Defined Network (SDN) controller to maintain a topology based on the RF path states, wherein the topology includes the POP, the RFGWs and the SNC; and a media access control (MAC) layer to route network traffic between the POP, the RFGWs and the SNC based on the topology. The SNC includes a bandwidth manager to allocate bandwidth, to provide flow control to the terminals, and to provide a key state including a bandwidth allocation for each of the terminals, a key state manager to maintain the key states, and a link layer control (LLC) to transport network traffic over each of the RF paths.

A method for communicating network traffic between terminals and an external network with a shared bandwidth network system. The method including: providing a point of presence (POP) for the external network; providing Radio Frequency Gateways (RFGWs) wherein each RFGW of the RFGWs provides one or more Radio Frequency (RF) paths and each of the RF paths links a respective RFGW of the RFGWs with one or more terminals of the terminals; managing a RF path state for each of the RF paths; providing a Satellite Network Core (SNC) for allocating bandwidth, providing flow control to the terminals, and providing a key state comprising a bandwidth allocation for each of the terminals, maintaining the key states, and transporting network traffic over each of the RF paths; maintaining a topology based on the RF path states, wherein the topology comprises the POP, the RFGWs and the SNC; and routing network traffic between the POP, the RFGWs and the SNC based on the topology.

Additional features will be set forth in the description that follows, and in part will be apparent from the description, or may be learned by practice of what is described.

DRAWINGS

In order to describe the manner in which the above-recited and other advantages and features may be obtained, a more particular description is provided below and will be rendered by reference to specific embodiments thereof which are illustrated in the appended drawings. Understanding that these drawings depict only typical embodiments and are not, therefore, to be limiting of its scope, implementations will be described and explained with additional specificity and detail with the accompanying drawings.

FIG. 6 illustrates an exemplary process for communicating traffic with a shared bandwidth network according to various embodiments Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

Embodiments are discussed in detail below. While specific implementations are discussed, this is done for illustration purposes only. A person skilled in the relevant art will recognize that other components and configurations may be used without parting from the spirit and scope of the subject matter of this disclosure.

The terminology used herein is for describing embodiments only and is not intended to be limiting of the present disclosure. As used herein, the singular forms "a," "an" and "the" are intended to include the plural forms as well, unless the context clearly indicates otherwise. Furthermore, the use of the terms "a," "an," etc. does not denote a limitation of quantity but rather denotes the presence of at least one of the referenced items. The use of the terms "first," "second," and the like does not imply any order, but they are included to either identify individual elements or to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. Although some features may be described with respect to individual exemplary embodiments, aspects need not be limited thereto such that features from one or more exemplary embodiments may be combinable with other features from one or more exemplary embodiments.

In a prior art satellite system gateways provide satellite access to remote terminals by aggregating Radio Frequency (RF) signals, while handling Media Access Layer (MAC) or Satellite Link Control/Media Access Control (SLC/MAC) module, handling Internet Protocol (IP) and acceleration modules, realizing user subscription services via a user subscription services module, and connecting the traffic to the Internet.

A satellite network system may use Geosynchronous Earth-Orbit (GEO) satellites, Medium Earth-Orbit (MEO) satellites, Low Earth-Orbit (LEO) satellites, or a High-Altitude Platform (HAP). In some embodiments, an optical fiber may be used to transfer an Intermediate Frequency (IF) signal across a distance to place the RF and associated antenna equipment remote from a remainder of a gateway. In some embodiments, a satellite network system may be divided at multiple places to separate Radio Frequency (RF) equipment from other ground systems performing other functions. The divisions may include, but are not limited to, splitting a MAC layer such that modulation and demodulation modules are co-located with the RF antenna, but removed from other SLC/MAC, IP and acceleration modules. In some embodiments, splitting the link and network layers such that the SLC/MAC modules in the link and network layers are co-located with the RF antenna but removed from IP and acceleration modules.

The present teachings may provide benefits, without limitation, such as:

High availability while utilizing a higher throughput spectrum.

Handling diverse RF sites for rain fade in the higher throughput spectrum (for example, the Q- and V-band) and supporting a quick switchover without needing to burden the outage with the need to reestablish state. Q-band in common usage refers to electromagnetic spectrum in a frequency range between 33 and 50 gigahertz (GHz), while V-band may refer to frequencies ranging from 40 to 75 GHz.

Separating site selection optimization problems due to, for example, a larger number of dry locations required for Radio Frequency Gateways (RFGWs) from a potentially smaller number of locations that have good Internet access.

Reducing the number of Internet Points of Presence (POPs).

Utilizing pooled redundancy of a set of key network resources to reduce a need for 1:N redundancy of data centers.

Easily redirecting end-to-end traffic to the appropriate network services.

Easily redirecting internal traffic to the appropriate serving data center using the best path.

Retaining an inroute bandwidth allocation state across a switchover from one RFGW to another RFGW, for example, a diverse RFGW.

Due to the nature of bandwidth assignment and acceleration modules, a large amount of state is kept for a given terminal and there is a need to re-establish that state when a link is switched. Establishing the state after a switchover of a RF path may take considerable time and resources, for example, establishing the state may be the longest element of a switchover. Examples of state that may be maintained to speed up switchover include: an inroute bandwidth allocation state, a timing state, a power state, a transmission control protocol (TCP) acceleration state, a compression state, a web acceleration state, and other applications and service state.

In the present teachings, a Radio Frequency Gateway (RFGW) may include the physical layer modules required for transmitting and receiving RF signals with the satellite from a given earth station. The RFGW may include modulation and demodulation modules. The RFGW may include equipment required for clock synchronization. The RFGW may include portions of the MAC layer. The RFGW may include modules required to manage the components and services at the RF Gateway. The RFGW may include modules required to route packets over a core network to one or more of the SNCs. Driving factors for the location of the RFGW may include the satellite design and the rain characteristics of the location.

In the present teachings, a Satellite Network Core (SNC) includes portions of the MAC layer, the Satellite Link Control (SLC) layer, the IP layer, and the acceleration layers. The SNC may include modules required to manage the components and services at the SNC. This may include link adaptation, context establishment and bandwidth allocation to minimize the handover process and time. The SNC may include modules required to route packets over a core network: to/from the RFGW, to/from the Internet or Internet Point of Presence (POP), and to/from other SNCs. This may or may not be the final destination for a packet before the packet is routed to its destination, for example, over the Internet. For example, a packet may be routed to a centralized Carrier Grade NAT (CGN) (Network Address Translation (NAT)) module at another SNC before it can be routed to the Internet. The SNC may include additional resources as required to take over for beams/resource pools serviced by one or more other SNCs. Driving factors for the location of the SNC may include: minimizing latency between the SNC and the RFGW, minimizing Core Network operational expenditure, and availability/cost of high throughput access to Internet or Internet POP.

In the present teachings, a Core Backhaul Network includes a private, segment routed network, for example, a ring, interconnecting multiple RFGWs, SNCs, and Internet POP.

In the present teachings, a diversity group includes a grouping of a set of SNCs, their associated RFGWs, and their associated diverse RFGW(s). In some embodiments, during normal operation RFGWs are switched to a diverse RFGW within the same diversity group. In some embodiments, during normal operation, for an SNC outage, the beams that the unavailable SNC services are switched to other SNCs in the same diversity group. A Diverse RFGW includes a RFGW that can be switched to when rain is imminent or present at the primary RFGW.

In the present teachings, a resource pool includes a collective set of inroute and outroute resources that are dynamically utilized by a set of terminals in the same geographic region (or beam). There may be one or multiple resource pools in each beam. In some embodiments, a beam and its supporting virtual functions are the smallest granularity that can be moved to another SNC.

Figure 1:
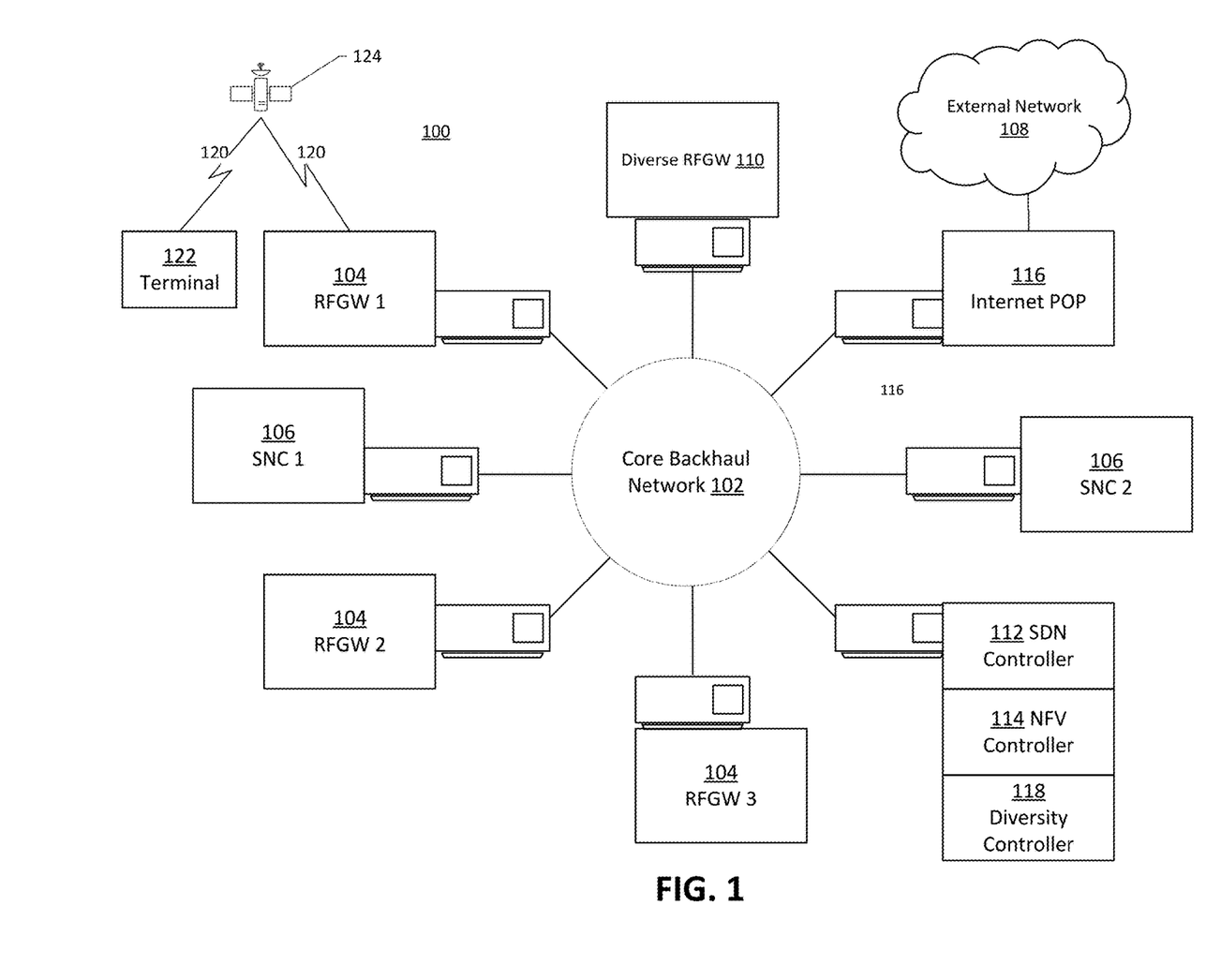
FIG. 1 illustrates an exemplary shared bandwidth network system.

FIG. 1 illustrates an exemplary shared bandwidth network system. A shared bandwidth network system 100 may include RFGWs 104 (RFGW 1, RFGW 2, RFGW 3), SNCs 106 (SNC 1, SNC 2), a diverse RFGW 110, an SDN controller 112, an NFV controller 114, an Internet Point of Presence (POP) 116, and a diversity controller 118 connected to each other via a core backhaul network 102. The Internet POP 116 may be connected to an Internet Gateway (IPGW) (see FIG. 5) disposed, functionally or logically, in the SNC 106. The present teachings provide for:

Retention of state during the movement of resources from one of the RFGWs 104 to another of the RFGWs 104;

Flexible assignment of a pool of resources (e.g., a beam) between the SNCs 106;

Use of Software Defined Network techniques such as Segment Routing using IPv6 extension headers for helping in quick re-routing of flows without depending on the convergence of traditional routing protocols; and Pooled redundancy of the SNCs 106 such that all SNCs 106 can be operational as opposed to having a dedicated backup SNC, where an outage of an SNC causes its resources to be spread to the other SNCs in the pool.

In exemplary embodiments, an RF path 120 may be serviced primarily by one of the RFGWs 104. In exemplary embodiments, the RF path 120 may be serviced primarily by one of the SNCs 106. There may a plurality of RF paths 120 associated with one of the RFGWs 104. There may a plurality of RF paths 120 associated with one of the SNCs 106. There may a plurality of SNCs 106 associated with one of the RFGWs 104. Every RF path 120 associated with one of the RFGWs 104 may or may not be associated with the same SNC of the SNCs 106. The RF path 120 may provide a path for a terminal 122 to connect to the Internet POP 116. In some embodiments, the RF path 120 may be relayed to the terminal via a satellite 124.

The diversity controller 118 may monitor one or more the RF path 120, the RFGW 104, or the SNC 106. The diversity controller 118 may update a RF path state of the RF path 120, the RF paths associated with the RFGWs 104, or the RF paths associated with the SNCs 106. The RF path 120, and its associated RF key state, may be switched to a diverse RFGW 110. The switch may be associated with an outage, an imminent outage, a rebalancing of network traffic via the RFGW 104, a rebalancing network traffic via the SNC 106, or a rebalancing of the traffic via the Internet POP 116. Some or all the RFGWs 104 may service beams from one or more of the SNCs 106. Based on the satellite 124, the switch or take over may be in series and not at the same time. The RFGW 104 may be backed up by a diverse RFGW 110. The SNC 106 utilizes one or more RFGWs 104 at the same time independent of diversity. The SNC 106 may dynamically start to provide services to a beam that it was not previously servicing. In some embodiments, when the RFGW 104 is switched to the diverse RFGW 110, all resources associated with the RFGW 104, regardless of which SNC 106 serviced the RFGW 104, are moved to the diverse RFGW 110.

The SDN controller 112 may actively react to network topology changes, network conditions, desired diversity state or the like, while providing source routing and other network control information. In some embodiments, the SDN controller 112 provides source routing information for an outer nest (or outer source routing) such as, for service function chaining and routing between the SNCs 106 when necessary, and between the SNCs 106 to the Internet POP 116. The inner nest routing between components in the RFGW 104 and components in the SNC 106 does not involve the terminal 122. The inner nest routing is performed on traffic aggregated across multiple terminals, typically, terminals serviced by an RF path (beam). The source routing may be a function of an intersection of a priority, an active RFGW, an active SNC, and a state of the Core Network connecting the RFGW and SNC. The source routing information may include a standardized or non-standardized segment routing header to provide source routing and other network control information to and from the terminal 122. Segment Routing over IPv6 (SRv6) provides for an exemplary standardized source routing header. Source routing allows a sender of a packet to partially or completely specify: the route the packet takes through the network; and/or service processing performed on the packet along the path. In some embodiments, the Network Functions Virtualization (NFV) controller 114 provides network orchestration and redundancy.

In exemplary embodiments, the outer source routing and segments therein may be used for service chaining. Exemplary services may include:
  Web acceleration as a Service with true source transparency (web acceleration may assume that the web traffic uses port 80).
  Country or service specific security such as URL filtering, for example, to meet mandatory requirement for URL filtering.
  User specific services such as caching, security (for example, malware, anti-virus)
  Country specific Carrier Grade Network Address Translation (CGNAT), an endpoint of 464 or a DSLite tunnel
  Application Flow Identification and Shaping Traffic Steering
  Traffic Optimization and Multipath Hybrid overlays (more than one WAN path from a remote location)
  Consumer Internet Service Provider POP preference
  Enterprise Overlays
  End to end encryption, for example, IPsec at a Customer Data Center/Cloud Handoff Point
  Customer Data Center with a handoff from the Core network The present teachings provide a centralized architecture, mobility, basic connectivity of a Transit IPGW to an Anchor IPGW (or equivalent), roaming, a Centralized connecting of a Transit IPGW with a Central IPGW, an Anchor IPGW with a Central IPGW, or the like.

Figure 2:
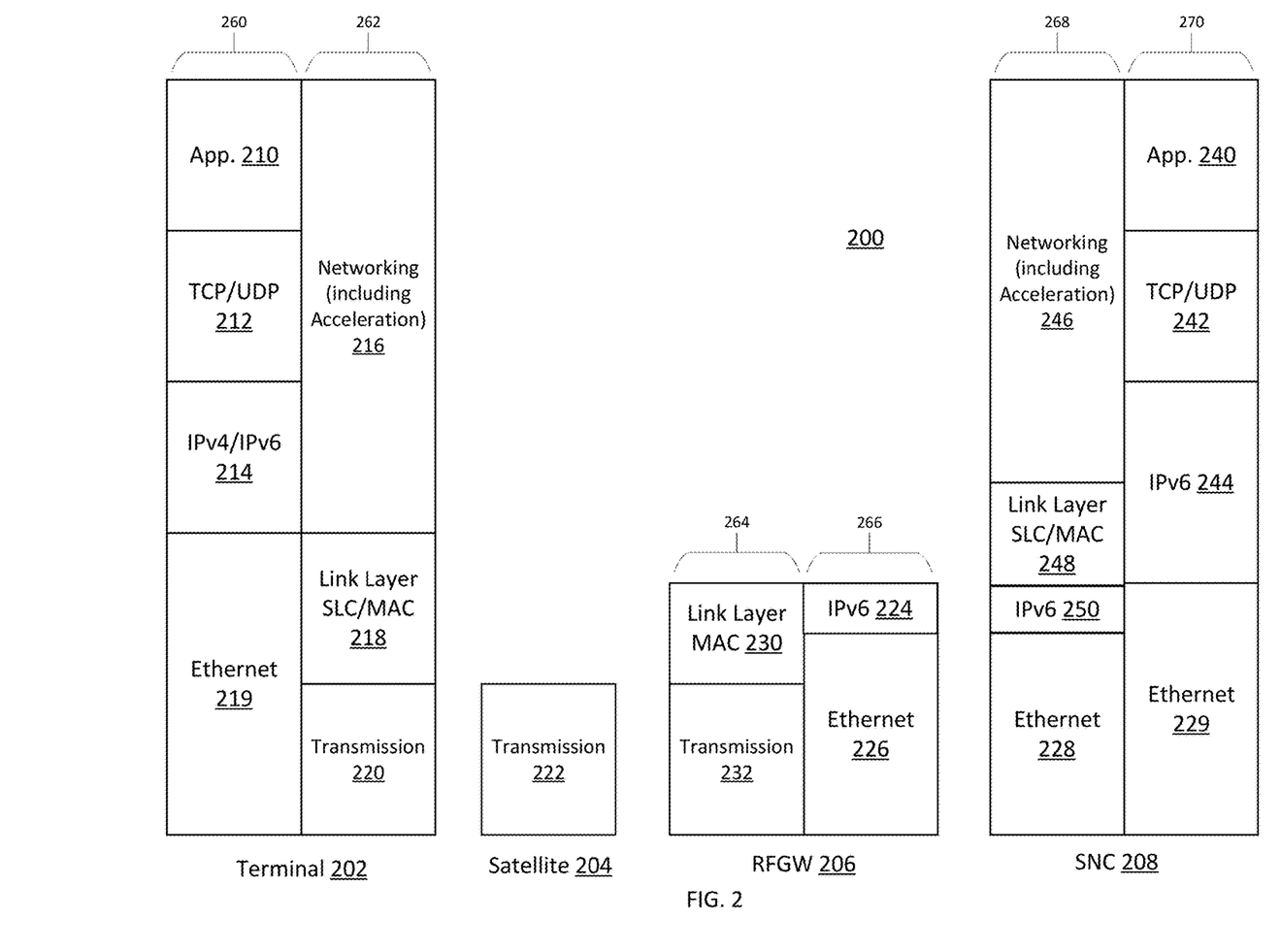
FIG. 2 illustrates a functional split between a shared bandwidth network according to various embodiments.

FIG. 2 illustrates a functional split between elements of a shared bandwidth network according to various embodiments.

FIG. 2 illustrates a shared bandwidth network system 200 including a terminal 202, a satellite 204, an RFGW 206 and an SNC 208. The terminal 202 may include network stacks, for example, a Transmission Control Protocol/Internet Protocol (TCP/IP) stack 260, and a satellite stack 262 to communicate with the SNC 208 via the satellite 204. The TCP/IP stack 260 may include an Ethernet layer 219, an IP layer 214, a Transmission Control Protocol/User Datagram Protocol (TCP/UDP) layer 212, and an application layer 210. The TCP/IP stack 260 may communicate with a local area network (not shown) connected to the terminal 202 and any devices disposed on the local area network. The satellite stack 262 may include a transmission layer 220, an SLC/MAC layer 218 and a networking support layer including acceleration 216. The SLC/MAC layer 218 is an exemplary Link Layer Control (LLC) protocol implementation for RF signals. Another example of an LLC protocol is the Radio Layer Control (RLC) protocol.

The satellite 204 may include a transmission side and a receive side (not shown) to relay communications between the terminal 202 and the RFGW 206.

The RFGW 206 may include a satellite stack 264 including a transmission layer 232 and a MAC layer 230. The transmission layer 232 may include a transmission side to transmit (outroute) and a receive side to receive (inroute) communications via the satellite 204, for example, modulation, demodulation, timing synchronization or the like. The MAC layer 230 manages the addressing of a 206 terminal 202 and/or gateways communicating via the satellite 204. The RFGW 206 may include an IPv6 266 stack including an ethernet layer 226 and an IPv6 layer 224. The RFGW 206 may use the IPv6 layer 224 to communicate with the SNC 208 using, for example, a core backhaul network (not shown). On the outroute, the RFGW 206 may encode and modulate packets received over the core backhaul network and transmit them as RF signals including bursts with the transmission layer 232. Similarly, on the inroute, the RFGW 206 decodes and demodulates the bursts received over the transmission layer 232, packetizes the decoded and demodulated bursts, and forwards the packets to the SNC 208 over the core backhaul network.

The SNC 208 may include a TCP/IP stack 270 and a satellite stack 268 to communicate with the terminal 202 via the RFGW 206 that is communicating with the satellite 204. The TCP/IP stack 260 may include an Ethernet layer 229, an IP layer 244, a TCP/UDP layer 242, and an application layer 240. The TCP/IP stack 260 may communicate with, for example, an Internet point of presence (not shown) over the core backhaul network or any other SNC services disposed on the core backhaul network. The satellite stack 268 may include an ethernet layer 228, an IPv6 layer 250, an SLC/MAC layer 248 and a networking support layer including acceleration 246.

In exemplary embodiments, modules of the RFGW 206 can be categorized at least as Outroute and Inroute. In some embodiments, the outroute modules may include: codeblock and key receipt, encryption, priority queueing and scheduling, IF conversion, modulation, RF transmit, timing packet creation and system information creation. In some embodiments, the Inroute modules may include: RF receive, IF conversion, burst demodulation, Sub-Carrier Multiple Access (SCMA) interference cancelation, SCMA group burst reconstruction, and Cyclic Redundancy Code (CRC) checks on burst.

In exemplary embodiments, modules of the Satellite Network Core (SNC) 208 can be categorized at least as outroute, inroute, IP layer, acceleration layer and application/service layer. In some embodiments, the outroute modules may include a User Packet Aggregation or Priority Packet Aggregation receipt module, a Generic Stream Encapsulation (GSE) module, a codeblock enqueuing module and a codeblock creation module. In some embodiments, the inroute modules may include reassembly, decryption, bandwidth allocation, link layer control messaging and handling of inroute control information modules. In some embodiments, the IP layer modules may include Robust Header Compression (ROHC) compression and decompression, scheduling, flow control including demand/assign messaging, and prioritization modules. In some embodiments, the Acceleration Layer modules may include TCP Acceleration and Web Acceleration modules. In some embodiments, the Application/Service Layer modules may include Domain Name System (DNS), flow prioritization, user security features, traffic shaping, and IPv4 network address translation modules.

Service, Flow, and Packet Handling

Terminals in a given beam may have a fixed mapping to an RFGW or the diverse RFGW currently handling traffic for the primary RFGW. Traffic for a beam may be moved and handled by a different SNC over time. At any moment in time, traffic for a beam may be serviced by a single SNC.

In some embodiments, traffic between the RFGWs and the SNC is not directly user traffic to/from a terminal. The traffic may contain part of a packet of a given terminal. The traffic may contain multiple packet or packet fragments of multiple terminals.

In some embodiments, the original IP header of the user packet may be compressed. The payload of the packet may be compressed. The part of the payload that is being carried may be encrypted.

In some embodiments, traffic between the RFGWs and the SNC may be turned into an IPv6 packet with segment header extensions and the segment may be routed through the Core Network/backbone to the appropriate the RFGW or SNC. Traffic within the SNC may be segment routed to one or more services (including acceleration services). Traffic out of an SNC may be segment routed directly to/from the appropriate Internet access point. Traffic out of an SNC may be to/from another SNC for the purposes of receiving services it needs (such as a centralized CGN). Traffic out of an SNC may be to/from another location for the purposes of handling mobility from an anchor point.

State Handling

For an RFGW Switchover, a bandwidth control state may be maintained. When a resource pool moves to another SNC (e.g., due to SNC outage), Bandwidth Control state may be re-established. A bandwidth control module may set the bandwidth control state of the terminal prior to the switchover. The bandwidth control module may reside at the SNC, the SDN controller or elsewhere. Due to many reasons, such as, link outage, congestion, RFGW switchover or the like, the delay between the SNC and RFGW can change. The present teachings dynamically adjust the bandwidth lookahead frame to account for changes in the time for the allocation control packets to reach the terminals. In some embodiments, the changes in time are based on a SNC to RFGW latency. The changes in time may be accommodated along with source route changes in the form of segment lists from the SDN controller.

During a switchover, the bandwidth control module may assume that a backlog or demand, for terminals serviced by the beams being switched, remains unchanged. As such, the bandwidth control module may proactively send or configure the terminal with its outroute or inroute bandwidth allocation while the switchover is in progress. This preallocation may enable new traffic to be switched to the switched over link while minimizing delays caused by the switchover, with no pause needed to coordinate or redirect traffic delivery.

The present teachings support nested levels of networking and SDN control. End to End Layer modules such as segment routing may be handled at the terminal and through the IP and above layer devices (e.g., IPGW, Web Acceleration, Country-specific CGN NAT, Country-specific Traffic Handling Services, etc.). This may allow service chaining and other routing from/to the terminal edge through until the packet exits the network to/from the Internet. Core Network Layer modules such as segment routing may be handled on encrypted codeblocks and bursts on the outroute and inroute to ensure optimal routing and handling through the Backhaul/Core between RFGWs and SNCs.

The backbone or core network may include a Core Network Layer SDN Controller. The SDN Controller may be a logically centralized entity in charge of (i) translating the requirements from an SDN Application layer down to the SDN datapaths and (ii) providing the SDN application with an abstract view of the network (which may include statistics and events). The SDN controller may include multiple controllers, the hierarchical connection of controllers, communication interfaces between controllers, virtualization or slicing of network resources, or the like.

Static inputs for the SDN controller may include: a resource pool/beam to RFGW map, a backhaul network ring and tail topology, priorities, an initial resource pool to SNC map, and the like. Dynamic inputs for the SDN controller may include: a RFGW switchover state, a backhaul network status (both ring and tail), an SNC status, a current resource pool to SNC map, and the like. The backhaul network status may include a link capacity, a link up/down status, a link performance (latency, jitter, Packet Loss Rate (PLR)), or the like. An SDN controller output may include a segment list per beam/priority. Packets at the terminal and internet may be IPv4 or IPv6.

Figure 3:
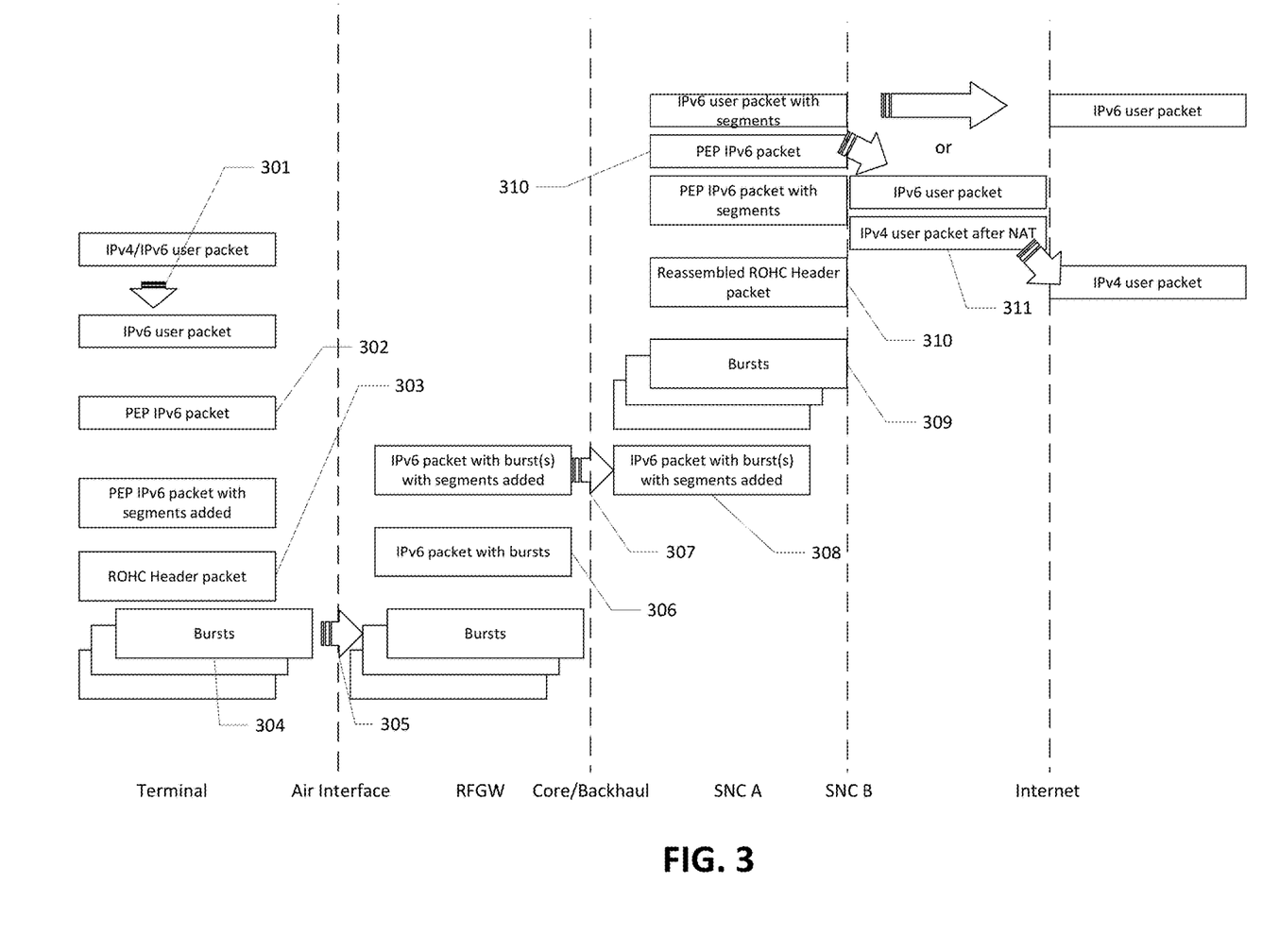
FIG. 3 illustrates an exemplary inroute nested packet flow according to various embodiments.

FIG. 3 illustrates an exemplary inroute nested packet flow according to various embodiments.

In FIG. 3 shows an inroute nested packet flow with the following highlights.

301. If the packet is IPv4, the terminal turns it into an IPv6 packet.

302. The terminal adds segments to the IPv6 header as a function of:
  a. Service chaining, for example, does the traffic flow need web acceleration
  b. Dynamic or static information provided to the terminal by a controller and/or the Network Management System (NMS)
  c. This is true whether it is the native packet or a Performance Enhancing Proxy (PEP) packet 303. Other techniques may be performed on the header such as Robust Header Compression (ROHC)

304. Packet and Burst encapsulations and segments (Internet Packet Encapsulation (IPE), Internet Booking Engine (IBE)) are performed according to an air interface definition and any bandwidth allocations. This includes using other link layer modules such as encryption and adding CRC fields.

305. The bursts are sent over the air arriving at the RFGW.

306. The bursts of one or more terminals can be combined into an IPv6 packet.

307. IPv6 header segments are added to the IPv6 header based on the direction from the controller.

308. The packets are segment routed across the backhaul/core network.

309. At the serving SNC, the bursts are reassembled, decrypted, etc.

310. After ROHC, PEP and other modules, the segments from the original packet may be used to route the packet elsewhere within the SNC (e.g., for web acceleration, security or other modules)

311. An IPv6 packet can be routed to the internet. A packet that was originally IPv4 may be segment routed to another SNC, for example, to an SNC that hosts the CGN for the region (like town, state, province, country) associated with the terminal before the packet is routed to the internet.

Figure 4:
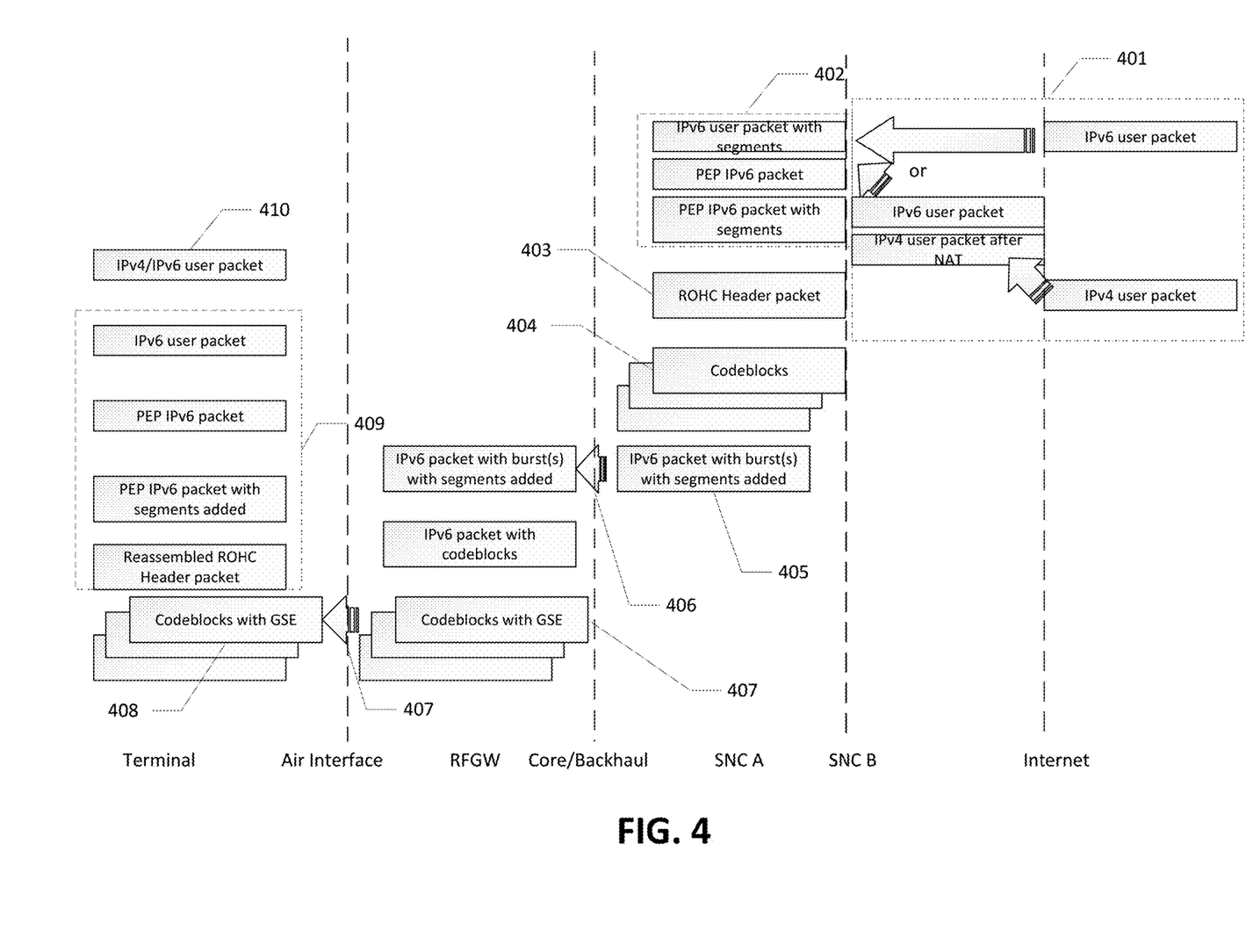
FIG. 4 illustrates an exemplary outroute nested packet flow according to various embodiments.

FIG. 4 illustrates an exemplary outroute nested packet flow according to various embodiments.

In FIG. 4 shows an outroute nested packet flow with the following highlights.

401. An IPv6 packet may be routed to the SNC from the internet. A packet that is IPv4 may be segment routed to another SNC that hosts the CGN for the region with which the terminal is associated may receive the packet from the internet and an IPv6 packet is created and segment routed to the SNC serving that terminal's beam.

402. The network adds segments to the IPv6 header as a function of:

a. Service chaining (e.g., does it need web acceleration)
b. Dynamic information provided by a controller
c. This is true whether it is the native packet or a PEP packet 403. Other techniques may be performed on the header such as ROHC 404. Codeblocks are formed which may contain partial or control packets of one or more terminals.

405. The codeblocks are encapsulated with IPv6 headers with segments IPv6 header extensions added, as required.

406. These IPv6 packets are sent over the backhaul/core network towards the currently serving RFGW.

407. The original codeblocks are extracted and sent over the air towards the terminals using Digital Video Broadcasting-Satellite-Second Generation Extensions (DVB-S2x).

408. At the serving terminal, packets for that terminal are reassembled, decrypted, etc.

409. After ROHC, PEP and other modules, an IPv6 user packet is created.

410. If the packet is originally IPv4, the terminal turns it back into an IPv4 packet before forwarding.

Using the exemplary illustration in FIG. 1, Table 1 illustrates a normal case of a Beam to RFGW to SNC relationship of the exemplary embodiment of FIG. 1, when the Diverse RFGW is not in use and all the SNCs are functioning.

TABLE 1

| Beam | RFGW | SNC |
|---|---|---|
| 1 | 1 | 1 |
| 2 | 1 | 1 |
| 3 | 1 | 1 |
| 4 | 1 | 1 |
| 5 | 2 | 1 |
| 6 | 2 | 1 |
| 7 | 2 | 1 |
| 8 | 2 | 1 |
| 9 | 3 | 2 |
| 10 | 3 | 2 |
| 11 | 3 | 2 |
| 12 | 3 | 2 |
| 13 | 4 | 2 |
| 14 | 4 | 2 |
| 15 | 4 | 2 |
| 16 | 4 | 2 |

Table 2 illustrates a Beam to RFGW to SNC relationship of the exemplary embodiment of FIG. 1 after a switchover of RFGW 1 to the Diverse RFGW.

TABLE 2

| Beam | RFGW | SNC |
|---|---|---|
| 1 | A | 1 |
| 2 | A | 1 |
| 3 | A | 1 |
| 4 | A | 1 |
| 5 | 2 | 1 |
| 6 | 2 | 1 |
| 7 | 2 | 1 |
| 8 | 2 | 1 |
| 9 | 3 | 2 |
| 10 | 3 | 2 |
| 11 | 3 | 2 |
| 12 | 3 | 2 |
| 13 | 4 | 2 |
| 14 | 4 | 2 |
| 15 | 4 | 2 |
| 16 | 4 | 2 |

Table 3 illustrates a Beam to RFGW to SNC relationship of the exemplary embodiment of FIG. 1 after an outage of SNC 2.

TABLE 3

| Beam | RFGW | SNC |
|---|---|---|
| 1 | 1 | 1 |
| 2 | 1 | 1 |
| 3 | 1 | 1 |
| 4 | 1 | 1 |
| 5 | 2 | 1 |
| 6 | 2 | 1 |
| 7 | 2 | 1 |
| 8 | 2 | 1 |
| 9 | 3 | 1 |
| 10 | 3 | 1 |
| 11 | 3 | 1 |
| 12 | 3 | 1 |
| 13 | 4 | 1 |
| 14 | 4 | 1 |
| 15 | 4 | 1 |
| 16 | 4 | 1 |

Figure 5:
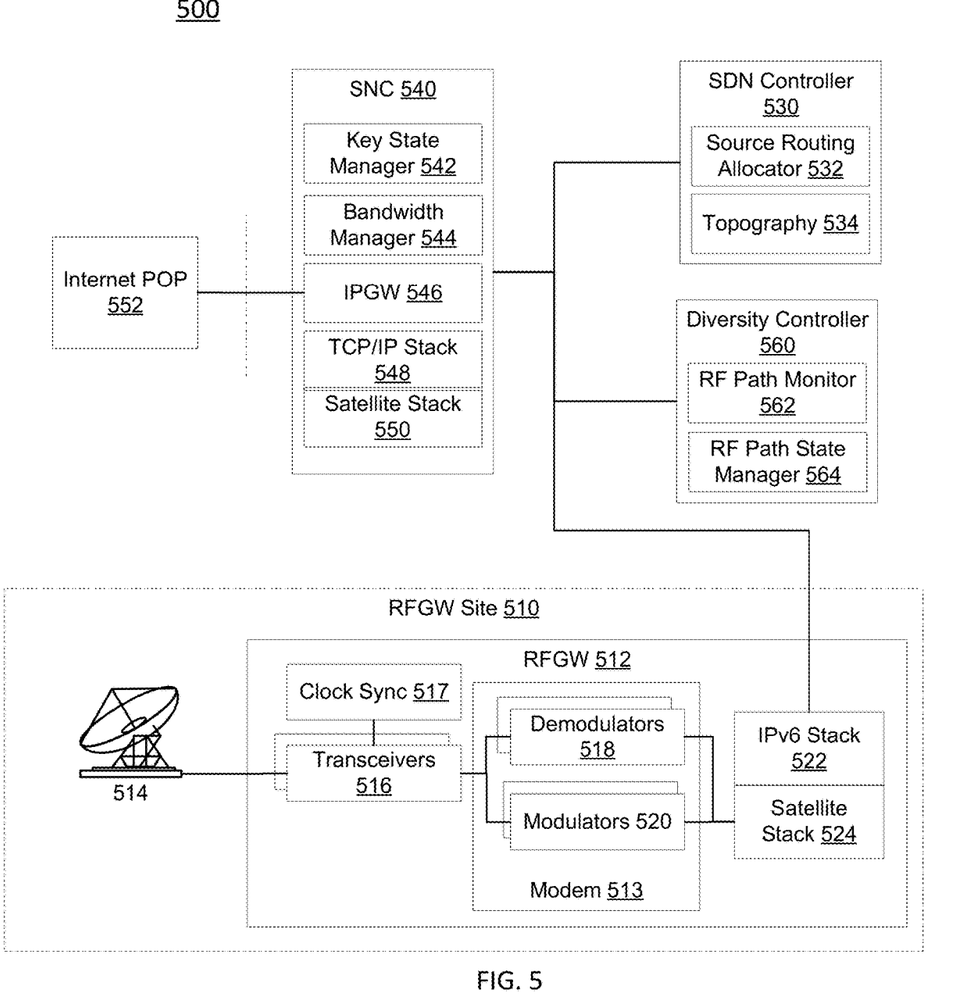
FIG. 5 illustrates an exemplary functional diagram of a shared bandwidth network according to various embodiments.

FIG. 5 illustrates an exemplary functional diagram of a shared bandwidth network according to various embodiments.

FIG. 5 illustrates a shared bandwidth network 500 including a RFGW 512, an SNC 540, an SDN controller 530, a diversity controller 560 and an Internet POP 552. The RFGW 512 can be deployed at a remote site RFGW site 510. The RFGW 512 may include an antenna 514 to communicate with a satellite (not shown), one or more transceivers 516 connected to the antenna 514. Bursts of a RF Signal received by the transceivers are communicated to a modem 513 including demodulators 518 to generate a packet. The packet is communicated from the RFGW 512 via a satellite stack 524 (for example, satellite stack 264 of FIG. 2) and an IPv6 stack 522 (for example, IPv6 stack 266 of FIG. 2) to the SNC 540. Packets received by the modem 513 including modulators 520 to generate a burst signal to be transmitted via the one or more transceivers 516 via the antenna 514. The packet is communicated from the SNC 540 via a satellite stack 524 (for example, satellite stack 264 of FIG. 2) and an IPv6 stack 522 (for example, IPv6 stack 266 of FIG. 2) to the RFGW 512.

The SNC 540 can include a key state manager 542, a bandwidth manager 544, an IPGW 546, a TCP/IP stack 548 (for example, TCP/IP stack 270 of FIG. 2) and a satellite stack 550 (for example, satellite stack 268 of FIG. 2). The key state manager 542 can create, delete, and update key state parameters associated with a terminal communicating with the RFGW 512. The bandwidth manager 544 can allocate bandwidth and provide flow control for communications to/from the terminal. The IPGW 546 connects to the Internet POP 552 via the TCP/IP stack 548.

The diversity controller 560 may include a RF path monitor 562 to monitor or detect an imminent or present unavailability of an RFGW or an RF path. The diversity controller 560 may include a RF path state manager 564 to add, delete or update parameters (for example, Modulation and Coding (MODCOD) in use, power level, signal to noise ratio and the like) associated with the RFGW or RF path.

The SDN controller 530 may include a source routing allocator 532 and a topography 534 of the network. The source routing allocator 532 may use the topography to provide a source routing for a traffic flow to/from the terminal. As the RF path state manager 564 updates the RF path states, the topography 534 changes. In response to the topography 534 changes, the source routing allocator 532 may update the source routing associated with an effected traffic flow. An exemplary terminal may include a Very Small Aperture Terminal (VSAT).

Figure 6:
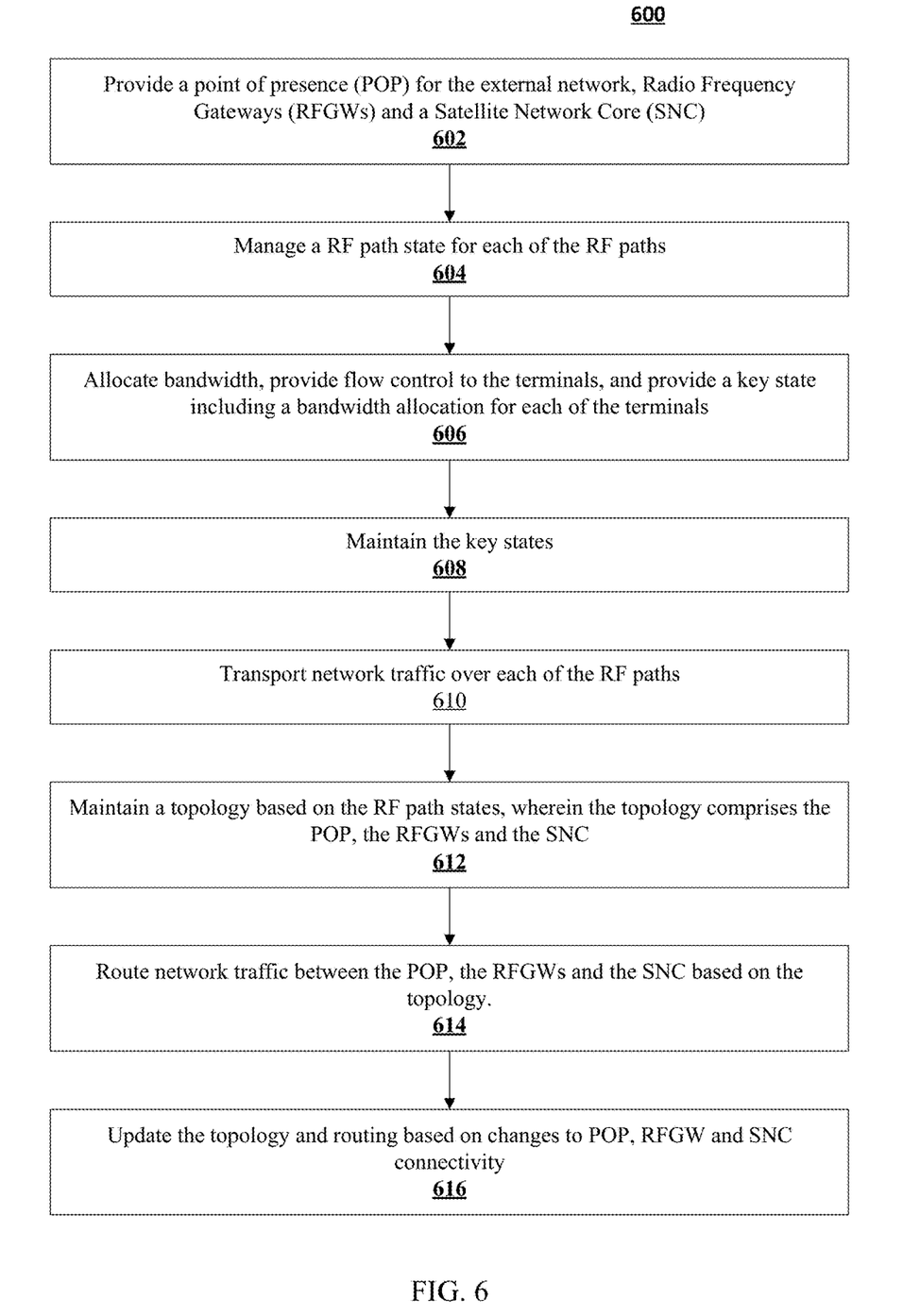

FIG. 6 illustrates an exemplary process for communicating traffic with a shared bandwidth network according to various embodiments.

FIG. 6 illustrates an exemplary process 600 for communicating traffic with a shared bandwidth network. The process includes an operation 602 to provide a point of presence (POP) for the external network, Radio Frequency Gateways (RFGWs) and a Satellite Network Core (SNC). The process includes an operation 604 to manage a RF path state for each of the RF paths. The process includes an operation 606 to allocate bandwidth, provide flow control to the terminals, and provide a key state including a bandwidth allocation for each of the terminals. The process includes an operation 608 to maintain the key states. The process includes an operation 610 to transport the network traffic over each of the RF paths. The process includes an operation 612 to maintain a topology based on the RF path states, wherein the topology comprises the POP, the RFGWs and the SNC. The process includes an operation 614 to route network traffic between the POP, the RFGWs and the SNC based on the topology. The process includes an operation 616 to update the topology and routing based on changes to POP, RFGW and SNC connectivity.

Although the subject matter has been described in language specific to structural features and/or methodological acts, it is to be understood that the subject matter in the appended claims is not necessarily limited to the specific features or acts described above. Rather, the specific features and acts described above are disclosed as example forms of implementing the claims. Other configurations of the described embodiments are part of the scope of this disclosure. Further, implementations consistent with the subject matter of this disclosure may have more or fewer acts than as described or may implement acts in a different order than as shown. Accordingly, the appended claims and their legal equivalents should only define the invention, rather than any specific examples given.

We claim as our invention:

1. A shared bandwidth network system to communicate network traffic between terminals and an external network, the shared bandwidth network system comprising:
a point of presence (POP) for the external network;
Radio Frequency Gateways (RFGWs) wherein each RFGW of the RFGWs provides one or more Radio Frequency (RF) paths, and each of the RF paths links a respective RFGW of the RFGWs with one or more terminals of the terminals;
an RF path state manager to manage a RF path state for each of the RF paths;
a Satellite Network Core (SNC) comprising
a bandwidth manager to provide a key state comprising a bandwidth allocation for each of the terminals, and
a key state manager to maintain the key state for each of the terminals going; and
a Software Defined Network (SDN) controller to maintain a topology based on the RF path states, wherein the topology comprises the POP, the RFGWs and the SNC, wherein
the SNC comprises a first SNC and a second SNC,
the RF paths are distributed among the first SNC and the second SNC, and
the POP comprises a first POP and a second POP.

2. The shared bandwidth network system of claim 1, further comprising a link layer control (LLC) to transport network traffic over each of the RF paths wherein the LLC transports the network traffic based on the bandwidth allocation for each of the terminals maintained in the key state manger.

3. The shared bandwidth network system of claim 1, further comprising a network layer to route network traffic between the POP, the RFGWs and the SNC based on the topology wherein the network layer routes based on source routing, and the SDN controller provides a source routing based on a source of the network traffic and the topology.

4. The shared bandwidth network system of claim 3, further comprising a Network Functions Virtualization (NFV) controller to manage an orchestration of the topology and active NFVs.

5. The shared bandwidth network system of claim 1, further comprising a diversity controller to provide a notification to the SDN controller, wherein
the RFGWs comprise a first RFGW and other RFGWs,
the notification notifies the SDN controller that network traffic using the first RFGW is to be directed to one of the other RFGWs, and
the SDN controller updates the topology based on the notification from the diversity controller.

6. The shared bandwidth network system of claim 5, wherein the SNC replicates the network traffic for the first RFGW to the one of the other RFGWs.

7. The shared bandwidth network system of claim 5, further comprising using the bandwidth allocation allocated prior to the notification, to perform flow control for the one or more terminals of the terminals of the first RFGW.

8. The shared bandwidth network system of claim 5, wherein the diversity controller notifies the SDN controller of an outage, an imminent outage, or a RF path link performance below a threshold for the first RFGW.

9. The shared bandwidth network system of claim 5, wherein
the notification notifies the SDN controller that the network traffic using the first SNC or the first POP is to be directed among either the second SNC or the second POP, and
the SDN controller updates the topology based on the notification from the diversity controller.

10. The shared bandwidth network system of claim 1, further comprising a diversity controller to provide a notification to the SDN controller, wherein
the notification notifies the SDN controller that network traffic using the first SNC is to be directed to the second SNC, and
the SDN controller updates the topology based on the notification from the diversity controller.

11. The shared bandwidth network system of claim 1, further comprising a diversity controller to provide a notification to the SDN controller, wherein
the notification notifies the SDN controller that network traffic using the first POP is to be directed to the second POP, and
the SDN controller updates the topology based on the notification from the diversity controller.

12. The shared bandwidth network system of claim 1, wherein the RF paths communicate with a respective one or more terminals via a satellite, the RF paths comprise beams, and the shared bandwidth network system comprises a Satellite Layer Control (SLC) to transport network traffic over each of the RF paths.

13. The shared bandwidth network system of claim 1, wherein the RFGW comprises a cellular base station, the RF paths comprise cell signals, and the shared bandwidth network system comprises a Radio Layer Control (RLC) to transport network traffic over each of the RF paths.

14. The shared bandwidth network system of claim 1, wherein the POP comprises an Internet POP.

15. The shared bandwidth network system of claim 1, wherein the SNC maintains one or more of a Transmission Control Protocol (TCP) acceleration state, a compression state, a web acceleration state, an application and service state, and an outer segment routing state.

16. The shared bandwidth network system of claim 1, wherein the key state further comprises an inroute bandwidth allocation state, a bandwidth allocation backlog, and a predictive bandwidth allocation backlog.

17. The shared bandwidth network system of claim 1, wherein the RF path state comprises one or more of a timing state, a power state, a Modulation and Coding (MODCOD), a carrier, a symbol rate, a RF path link capacity, a RF path link up/down status, and a RF path link performance.

18. The shared bandwidth network system of claim 1, wherein the topology comprises one or more of RF paths to RFGW map, a core backhaul network ring and tail topology, priorities, an initial resource pool to SNC map, a RFGW switchover state, an SNC status, a current resource pool to SNC map, a RF path link capacity, a RF path link up/down status, and a RF path link performance.

19. The shared bandwidth network system of claim 1, wherein network traffic of the shared bandwidth network system is segregated by a plurality of network traffic priorities, and the SDN controller provides a source routing per network traffic priority.

20. The shared bandwidth network system of claim 1, wherein network traffic of the shared bandwidth network system is relayed between the terminals and the POP with a nested layer spanning from each of the RFGWs to the POP via the SNC.

* * * * *